United States Patent

Nakaya

[11] Patent Number: 5,215,314
[45] Date of Patent: Jun. 1, 1993

[54] GASKET WITH MAIN AND AUXILIARY GROMMETS

[75] Inventor: Minoru Nakaya, Tokyo, Japan

[73] Assignee: Ishikawa Gasket Co., Ltd., Tokyo, Japan

[21] Appl. No.: 921,797

[22] Filed: Jul. 30, 1992

[30] Foreign Application Priority Data

Aug. 12, 1991 [JP] Japan .................. 3-063627[U]

[51] Int. Cl.⁵ .............................. F16J 15/08
[52] U.S. Cl. .................. 277/235 B; 277/180; 277/235 R
[58] Field of Search ............... 277/178, 180, 199, 227, 277/235 R, 235 A, 235 B

[56] References Cited

U.S. PATENT DOCUMENTS

| | | | |
|---|---|---|---|
| 4,284,282 | 8/1981 | Lonne | 277/235 B |
| 4,369,980 | 1/1983 | Backlin | 277/235 B |
| 4,531,750 | 7/1985 | Herrington | 277/235 B |
| 4,619,459 | 10/1986 | Herrington | 277/235 B |
| 5,058,908 | 10/1991 | Udagawa | 277/235 B |
| 5,120,078 | 6/1992 | Udagawa | 277/180 |

FOREIGN PATENT DOCUMENTS 1260236  1/1972  United Kingdom ........... 277/235 B

Primary Examiner—William A. Cuchlinski, Jr.
Assistant Examiner—D. DePumpo
Attorney, Agent, or Firm—Kanesaka and Takeuchi

[57] ABSTRACT

The gasket of the invention is formed of a compressible gasket member, a ring member, and main and auxiliary grommets. The auxiliary grommet is installed around a hole of the gasket member, and the ring member is situated inside the auxiliary grommet. The main grommet is arranged to surround the auxiliary grommet and the ring member. When the gasket is tightened, surface pressure is formed on the ring member and the auxiliary grommet without concentrating at one portion. Thus, the area around the hole is effectively sealed without deforming the engine parts.

6 Claims, 1 Drawing Sheet

GASKET WITH MAIN AND AUXILIARY GROMMETS

BACKGROUND OF THE INVENTION AND RELATED ART STATEMENT

The present invention relates to a gasket having main and auxiliary grommets around a hole to be sealed.

In a gasket, a grommet is frequently used to seal around a hole. A wire ring may be installed between flanges of the grommet to provide surface pressure thereat when the grommet is tightened.

When the grommet is installed in a metal laminate gasket formed of a plurality of metal plates, the metal plates are formed to have beads to thereby provide surface pressures on and around the grommet. However, when the gasket is basically formed of a compressible material, such as mixture of fibers and binders, the grommet is simply installed around a hole with or without the wire ring, because it is difficult to provide means for providing surface pressure on the compressible material.

Therefore, in the gasket formed of the compressible material and the grommet, when the gasket is tightened, generally one surface pressure is formed at the grommet around the hole to be sealed. In this gasket, since the surface pressure is concentrated at one portion, high surface pressure is formed around the hole. If surface pressure is strong, engine parts around the hole may be deformed by the high surface pressure.

Therefore, it is desirable not to concentrate the surface pressure at one portion around a hole to be sealed. However, in the conventional gasket formed of the compressible material, there is no means to properly disperse the surface pressure around a hole to be sealed.

Accordingly, one object of the present invention is to provide a gasket formed a compressible material and a grommet, wherein the surface pressure for sealing around a hole is not concentrated at one area.

Another object of the invention is to provide a gasket as stated above, wherein the surface pressure is widely formed on the engine parts to prevent damage of the engine parts.

A further object of the invention is to provide a gasket as stated above, which can be easily and economically manufactured.

Further objects and advantages of the invention will be apparent from the following description of the invention.

SUMMARY OF THE INVENTION

In the present invention, the gasket is installed in an internal combustion engine having at least one hole to be sealed.

The gasket is formed of a compressible gasket member extending substantially throughout an entire area of the engine, a main grommet situated around a hole of the compressible gasket member, and a ring member situated around a curved portion of the main grommet, as in the conventional gasket.

In the present invention, an auxiliary grommet is fitted closely around the hole of the compressible gasket member. Namely, the auxiliary grommet includes an auxiliary curved portion situated inside the hole, and upper and lower auxiliary flanges situated outside upper and lower surfaces of the gasket member.

Upper and lower flanges of the main grommet are located outside the upper and lower auxiliary flanges. A space is formed between the auxiliary curved portion and a curved portion of the main grommet. The ring member is situated in the space.

When the gasket is situated between two engine parts, such as a cylinder head and a cylinder block and is tightened, the ring member and the auxiliary grommet are compressed to provide surface pressures thereat. Namely, since the auxiliary grommet is formed around the hole, at which the compressible gasket member is relatively strongly compressed, the surface pressure is formed on the auxiliary grommet as well as the ring member.

In this case, if the auxiliary grommet is not formed, the compressible gasket member is compressed at the flanges of the main grommet, but the sufficient surface pressure is not formed thereat. Thus, the surface pressure is only formed on the ring member, so that the surface pressure is concentrated at the ring member. If high pressure is applied on the ring member, therefore, the main grommet on the ring member may be broken.

The upper and lower flanges of the main grommet may extend beyond the upper and lower auxiliary flanges, respectively, to be situated on parts of the compressible gasket member. As a result, an intermediate compressed portion is formed outside a high compressed portion held between the auxiliary flanges of the auxiliary grommet. The intermediate compressed portion prevents flow of the compressible gasket member from the high compressed portion.

On the other hand, the upper and lower flanges of the main grommet may be situated on the upper and lower auxiliary flanges without directly contacting the compressible gasket member. In this case, the main grommet can slide over the auxiliary grommet when stress is formed at the main grommet.

DETAILED DESCRIPTION OF PREFERRED EMBODIMENTS

Figure 1:
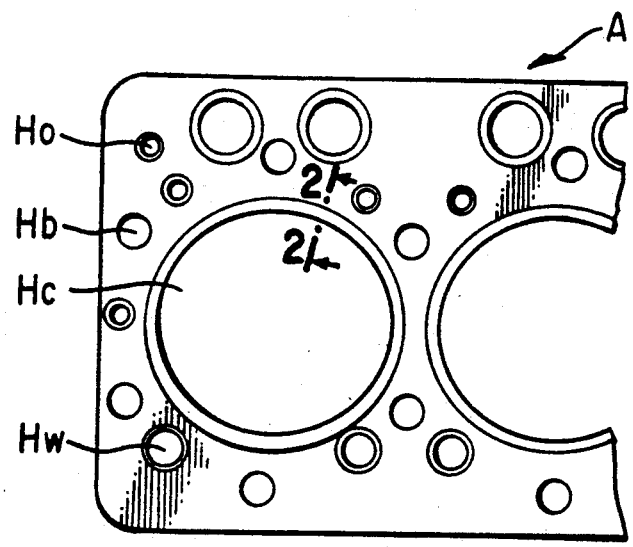
FIG. 1 is a plan view of a part of a first embodiment of a gasket of the present invention.
Figure 2:
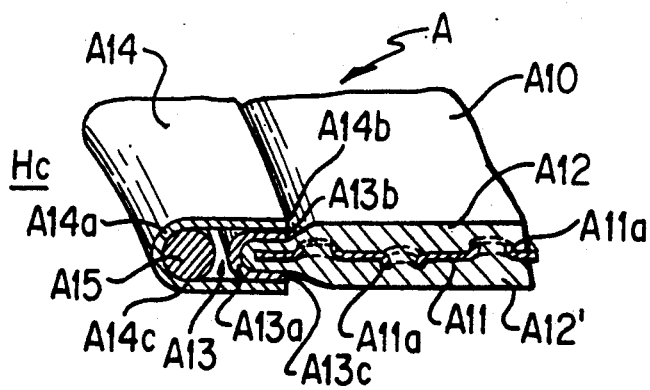
FIG. 2 is an enlarged perspective section view taken along a line 2—2 in FIG. 1.

Referring to FIGS. 1 and 2, a first embodiment A of a gasket of the invention is shown. The gasket A is a cylinder head gasket, and is provided with a plurality of cylinder bores Hc, water holes Hw, oil holes Ho, bolt holes Hb and so on, as in the conventional gasket.

In the gasket A, areas around the cylinder bores Hc are sealed in accordance with the present invention, and areas around other holes are sealed by other sealing devices. Since the subject matter of the invention is a sealing mechanism around the cylinder bore Hc, the other sealing devices are not explained. Any sealing devices may be used.

As shown in FIG. 2, the gasket A is formed of a compressible gasket member or base portion A10 extending substantially throughout the entire area of the engine parts. The base portion A10 is formed of a metal plate A11, and graphite sheets A12, A12, adhered on both sides of the metal plate A11.

The metal plate A11 includes a plurality of projections A11a extending upper and lower directions. The projections A11a engage the graphite sheets A12, A12', so that the graphite sheets A12, A12' do not slide relative to the metal plate A11.

An inner or auxiliary grommet A13 is situated around a hole of the base portion A10, which is larger than the cylinder bore Hc of the engine. The grommet A13 includes a curved portion A13a and upper and lower flanges A13b, A13c situated over the base portion A10.

An outer or main grommet A14 is situated over the inner grommet A13. The outer grommet A14 includes a curved portion A14a to define the cylinder bore Hc, and upper and lower flanges A14b, A14c situated outside the upper and lower flanges A13b, A13c of the inner grommet A13. A wire ring A15 is situated between the upper and lower flanges A14b, A14c to surround the cylinder bore Hc.

When the gasket A is formed, the grommet A13 is at first situated around the hole of the base portion A10. At this time, the grommet A13 is not fully tightened to compress the graphite sheets A12, A12, Then, the grommet A14 is arranged over the grommet A13, and the wire ring A15 is situated in the grommet A14. When the grommet A14 is shaped, the grommets A13, A14 are tightened together as shown in FIG. 2. However, if desired, the grommets A13, A14 may be independently shaped or formed.

When the gasket A is tightened between the cylinder head and the cylinder block (both not shown), the gasket A is equally and entirely compressed. Since compressibility at the wire ring A15 and the grommet A13 are limited, high surface pressures are formed at the wire ring A15 and the grommet A13. The surface pressure at the wire ring A15 is greater than that at the grommet A13.

In the gasket A, two different surface pressures are formed on the grommet A14. Therefore, the surface pressure around the cylinder bore Hc is not concentrated at one narrow area, so that the area around the cylinder bore is properly sealed without causing deformation of the cylinder head and the cylinder block. The grommet A14 is not damaged as well.

Figure 3:
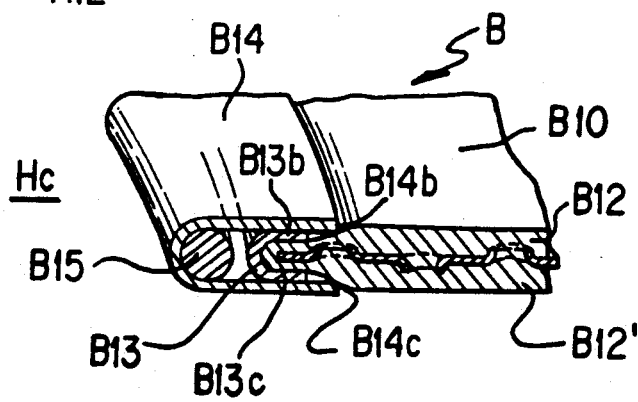
FIGS. 3 and 4 are perspective section views, similar to FIG. 2, of second and third embodiments of a gasket of the invention.

FIG. 3 shows a second embodiment B of a gasket of the invention. The gasket B includes a base portion B10, an inner grommet B13, an outer grommet B14, and a wire ring B15, as in the gasket A. However, in the gasket B, upper and lower flanges B14b, B14c of the grommet B14 extend beyond upper and lower flanges B13b, B13c of the grommet B13 and contact graphite sheets B12, B12'.

When the gasket B is tightened between the cylinder head and the cylinder block, parts of the graphite sheets B12, B12' outside the upper and lower flanges B13b, B13c are compressed by the upper and lower flanges B14b, B14c. Therefore, the compression pressure of the graphite sheets B12, B12' situated between the flanges B13b, B13c changes gradually through the portions between the flanges B14b, B14c. Since the compression pressure for the graphite sheet does not significantly change suddenly, flow of the graphite sheet between the flanges B13b, B13c is effectively prevented.

Especially, in case the grommet B13 is made of a thick plate, the graphite sheets B12, B12' are liable to flow. However, in the gasket B, the flow of the graphite sheets B12, B12' is prevented. The rest of the structure of the gasket B is the same as that of the gasket A.

Figure 4:
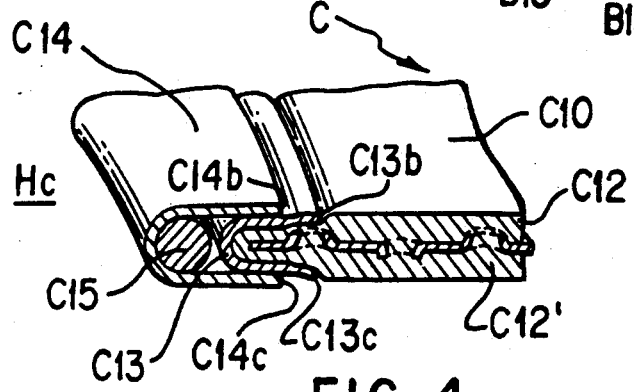

FIG. 4 shows a third embodiment C of a gasket of the invention. The gasket C includes a base portion C10, an inner grommet C13, an outer grommet C14, and a wire ring C15, as in the gasket A. However, in the gasket C, upper and lower flanges C13b, C13c of the grommet C13 extend longer than the upper and lower flanges C14b, C14c of the grommet C14. The flanges C14b, C14c do not contact the graphite sheets C12, C12'.

When the gasket C is tightened between the cylinder head and the cylinder block, parts of the graphite sheets C12, C12, located outside the flanges C14b, C14c and between the flanges C13b, C13c are compressed less than those between the flanges C14b, C14c. Therefore, the compression pressure between the flanges C13b, C13c changes gradually, as in the gasket B.

Further, since the grommet C14 directly contacts the grommet C13, the flanges C14b, C14c can slide over the flange C13b, C13c when stress is formed therebetween. Therefore, excessive stress is not applied to the grommet C14. The rest of the structure and operation of the gasket C is the same as those of the gasket A.

In the present invention, since the auxiliary grommet is formed in the main grommet, the gasket can provide surface pressures on the wire ring and the auxiliary grommet without concentrating the surface pressure at one portion. The gasket can securely seal around the hole.

While the invention has been explained with reference to the specific embodiments of the invention, the explanation is illustrative and the invention is limited only by the appended claims.

What is claimed is:

1. A gasket for an internal combustion engine having at least one hole to be sealed, comprising,
   a compressible gasket member extending substantially throughout an entire area of the engine and having a first hole corresponding to the hole of the engine, upper and lower surfaces, and an edge portion around the first hole,
   an auxiliary grommet fitted closely to the gasket member around the first hole, said auxiliary grommet having an auxiliary curved portion situated inside the edge portion and upper and lower auxiliary flanges situated on the upper and lower surfaces of the gasket member around the edge portion thereof,
   a main grommet having a curved portion situated inside the auxiliary curved portion and surrounding the hole of the engine to form a space between the curved portion and the auxiliary curved portion, and upper and lower flanges situated on the upper and lower auxiliary flanges, and
   a ring member situated in the space between the curved portion and the auxiliary curved portion and between the upper and lower flanges of the main grommet to surround the hole of the engine, said ring member and the upper and lower auxiliary flanges, when the gasket is tightened, providing surface pressures around the hole of the engine to securely seal therearound.

2. A gasket according to claim 1, wherein said compressible gasket member includes a metal core plate having outer surfaces and a plurality of projections extending outwardly from the outer surfaces, and flexible sheets fixed to the outer surfaces of the core plate.

3. A gasket according to claim 2, wherein said compressible gasket member includes, when the gasket is compressed, a high compressed portion situated between the upper and lower auxiliary flanges, and a lower compressed portion outside the high compressed portion, said high compressed portion and the auxiliary grommet providing the surface pressure on the upper and lower auxiliary flanges.

4. A gasket according to claim 3, wherein said ring member is a wire ring.

5. A gasket according to claim 3, wherein said upper and lower flanges of the main grommet extend beyond the upper and lower auxiliary flanges of the auxiliary grommet, respectively, and are situated on parts of the compressible gasket member to thereby provide an intermediate compressed portion between the high and lower compressed portions to prevent flow of the compressible gasket member from the high compressed portion.

6. A gasket according to claim 3, wherein said upper and lower flanges of the main grommet are situated on the upper and lower auxiliary flanges, respectively, without directly contacting the compressible gasket member so that the main grommet can slide over the auxiliary grommet when stress is applied to the main grommet.

* * * * *